United States Patent Office 2,779,252
Patented Jan. 29, 1957

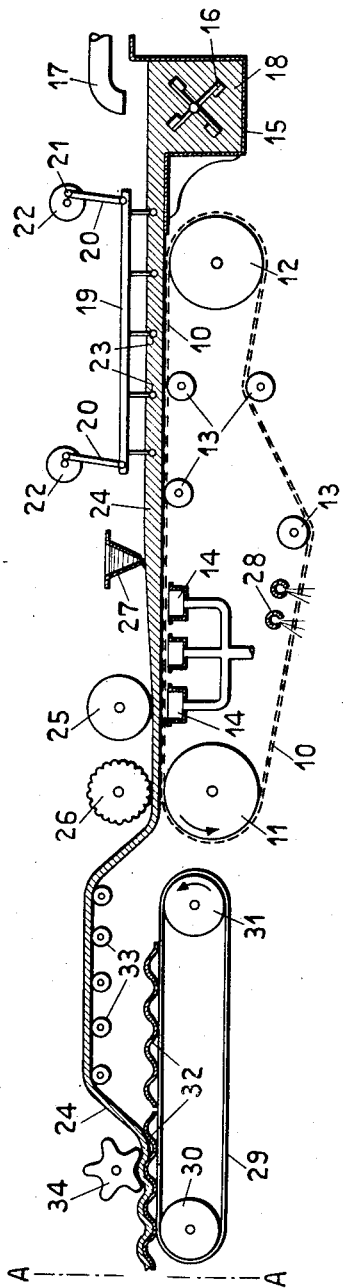

2,779,252

APPARATUS FOR MAKING BOARDLIKE PRODUCTS FROM A FIBROUS CEMENT MIXTURE

Alfred Welz, Zurich, Switzerland, assignor to Filtrox-Werk A. G., Sittertobel, St. Gallen, Switzerland Application May 11, 1953, Serial No. 354,092

Claims priority, application Switzerland May 15, 1952

1 Claim. (Cl. 92—39)

It is known to make board products from a mixture of fibrous materials and hydraulic cement, such as asbestos and Portland cement. So far, the method used comprised the following steps: scooping up a thin layer of the mushy mixture by means of a cylindrical sieve, separating the said layer from the sieve with the aid of a felt band and feeding the separated layer to a sizing roll via a flat suction means which serves for drainage, winding a plurality of said layers on top of each other until the desired board thickness has been attained, and cutting open the package thus produced to provide a board of which the length corresponds to the circumference of the sizing roll.

Such known method has various disadvantages of which the most serious is that the fibers in the boards produced clearly are orientated, which fact is attributable to the operation of scooping by means of a cylindrical sieve. Anyone skilled in the art knows that the strength of the boards produced in the manner described is at least 30% less in the fiber direction than transversely thereof. A further disadvantage is that such known method does not allow a continuous operation.

The present invention relates to another method of this type and to means for carrying out the same, and permits to eliminate the said disadvantages.

The method disclosed by the present invention substantially comprises the following steps: conducting the aqueous mixture in form of a slurry on to an endless sieve band, the thickness of such layer being a multiple of that of the boards to be produced; running the sieve band across at least one flat suction means which through dehydration and consolidation of the mixture gradually reduces the slurry thickness to that of the finished boards; and cutting up the web to boards of the desired size.

The means for carrying out the method disclosed by the present invention substantially comprise an endless sieve band run over guide rollers, means to continuously pass a slurry composed of an aqueous mixture of fibrous material and hydraulic binding agent on to a sieve band, and at least one flat suction means disposed below that strand of the sieve-band which serves for accommodating the slurry.

Further objects and features of the invention will become apparent from the claim, the drawing and the description.

One form of the means of the invention is schematically shown in the accompanying drawing and explained, together with the method, in the following description.

An endless sieve-band 10 runs over a plurality of guide rollers 11 to 13. The roller 11 by motor means (not shown) is driven in direction of the arrow shown to move the sieve band longitudinally. The upper strand of sieve band 10 runs over a plurality of flat suction means 14 which through pipes are connected to a vacuum pump (not shown). Before the guide roller 12 for the sieve band 10 is disposed a tank 15 of which the length approximates the width of sieve-band 10. Inside said tank is disposed an agitator 16 which is operable by motor means (not shown). Above tank 15 is disposed the nozzle of a pipe line 17 through which is supplied, from a mixer (not shown), a mushy aqueous mixture from which the boards are to be made. Above the sieve band is suspended through links 20 a vibrating unit 19 from crank pins 21 which are eccentrically disposed on motor-driven discs 22. The unit 19 comprises a plurality of depending vibrators 23 which terminate a short distance from the upper strand of sieve-band 10, extending across the entire width of the latter and dipping into the slurry 24 which from tank 15 flows on to the sieve band. A calender roll 25 for pressing the slurry 24 conveyed by the sieve band is disposed above the flat suction means 14 which is last in the direction of movement of the sieve band. A stamping roll 26 is mounted above the drive roller 11 of the sieve band. A trough 27 extending transversely of sieve band 10 and above the same is disposed before the flat suction means 14, as seen in the direction of movement of slurry 24. The trough 27 comprises a plurality of discharge openings which either extend across the entire sieve-band width or across only a portion thereof. The lower strand of sieve-band 10 passes in front of nozzle openings of spray pipes 28.

An endless conveyer 29 runs over guide rollers 30 and 31 of which the latter is driven by a motor (not shown) in direction of the arrow shown. The upper strand of conveyer 29 receives corrugated molds or elements 32 which, for example, are made of sheet iron and of which the width corresponds at least to that of sieve-band 10. The web 24 runs from the latter over transfer rolls 33 on to the conveyer 29 or, respectively, on to the molds 32 disposed on the conveyer. Above the latter is mounted a corrugated press roll 34 so that the web 24 may cling to the bodies 32.

Corrugated boards are made as follows. An aqueous mushy mixture of fibrous materials, such as asbestos, and hydraulic binding agents, such as Portland cement, is conducted through the pipe 17 into tank 15 and continuously stirred therein by the agitator 16. From tank 15, the mushy mixture moves on to the sieve band 10 where it forms a slurry 24. The latter by means of the vibrators 23 is distributed on the entire width of sieve band 10 and already condensed somewhat. A large part of the water contained in the mixture flows off through the meshes of sieve 10, whilst the cement adheres to the fibers. The slurry 24 is deposited on sieve band 10 in a thickness which is a multiple of that of the boards to be produced. The slurry thickness is controlled by the feed of mixture into tank 15. When the slurry 24 travels over the flat suction means 14, a substantial part of the water is withdrawn therefrom under the action of the vacuum, the structure of the fiber slurry at the same time being condensed or consolidated. The slurry thickness thus is gradually reduced to that of the boards to be produced, and the precondensed slurry 24 is pressed by means of the calender roll 25, while the stamping roll 26 imparts a certain pattern to the slurry surface. The lower strand of band-sieve 10 is freed from any slurry residues still adhering thereto on passing by the spray pipes 28.

From the calender roll 26, the web 24 runs over the rolls 33 to the press roll 34 by means of which it is placed in the corrugated bodies 32 which by means of conveyor 29 are being carried past and underneath the roll 34. The molds or elements 32 are of limited length only and are manually or mechanically mounted on the conveyor 29. Approximately at A—A the web is cut intermediate of two molds 32, thus producing individual corrugated boards which subsequently are subjected to a hardening process on their associated bodies 32. The boards then are removed from the bodies 32 which may be mounted again on the conveyor 29.

The slurry 24 suitably is applied continuously to sieve band 10, and the length of the boards to be made thus is unlimited. Since the mushy mixture 18 is not scooped up from tank 15, but flows freely on to the sieve band, the fibres in slurry 24 are not orientated in any particular direction. The boards produced thus are of the same strength in all directions, disregarding their shape.

Before the slurry is condensed, dyes or insulating and like materials which differ from the slurry mixture, may be embedded in the slurry surface by means of trough 27. According to the formation of the discharge opening of trough 27, single strips of other material extending in the longitudinal direction of the slurry may be covered or lined. In the subsequent slurry consolidation, the applied materials are bonded to the slurry material. Such foreign material may be applied, for example, for ornamental or other purposes.

With the aid of the means described, also flat boards may be produced by letting the slurry 24 run from the sieve-band 10 immediately on to the conveyor 29 and not using the shaping bodies 32 and the press roll 34. If the surface of the boards to be produced shall be plain, i. e. not be given any pattern, the stamping roll 26 is raised away from the web.

The shaping bodies 32 obviously may be given a different shape than the one shown and described, and the press roll 34 then is adapted to said shaping bodies.

In lieu of the inclined mechanical vibrators 23, electromagnetic or pneumatically operated vibrators may be used. Any number of vibrators may be used, and any number of flat suckers 14. In order to prevent the web 24 from leaving the sieve band 10 laterally, suitably square rubber belts (not shown) are mounted on both longitudinal edges of band 10, which belts revolve with the sieve band.

What I claim as new and desire to secure by Letters Patent, is:

An apparatus for the continuous production of plate-like elements from fibrous-cement mixture comprising a tank to receive a fluid mixture of fibrous-cement content and provided with an agitator and having an outlet at the top of the tank so that the fluid mixture can flow from the tank, a flat horizontal plate provided at the outlet and connected to the tank, an endless sieve band adjacent said plate and of which the top run is on the same level as said plate and extends from said plate so that the fluid mixture flows from the tank over the outlet and said plate onto the sieve band on the same level as the fluid mixture in the tank, said plate and band having the same approximate width, a plurality of vibrators provided above and dipping into the flow of fibrous mixture on the sieve band, and crank means connected to the vibrators to agitate the vibrators within the thickness of the flow of fibrous mixture.

References Cited in the file of this patent

UNITED STATES PATENTS

| | | |
|---|---|---|
| 1,463,961 | Ledeboer | Aug. 7, 1923 |
| 1,834,648 | Saunders | Dec. 1, 1931 |
| 1,973,722 | Nash | Sept. 18, 1934 |
| 2,178,631 | Frost | Nov. 7, 1939 |
| 2,276,083 | Moeller | Mar. 10, 1942 |
| 2,401,663 | Rembert | June 4, 1946 |
| 2,422,345 | Easterberg et al. | June 17, 1947 |

FOREIGN PATENTS

| | | |
|---|---|---|
| 103,843 | Great Britain | Feb. 5, 1917 |
| 554,132 | Great Britain | June 22, 1943 |